United States Patent
Hseush et al.

(10) Patent No.: US 11,494,398 B1
(45) Date of Patent: Nov. 8, 2022

(54) FEDERATED DATA EXPLORATION SYSTEMS AND INTEROPERABLE DATA EXPLORATION APPARATUSES

(71) Applicant: BigObject Inc., Taipei (TW)

(72) Inventors: Wenwey Hseush, Taipei (TW); Hsin Hua Cheng, Taipei (TW); Ya Chu Chen, Taipei (TW); Hsien Hui Pan, Taipei (TW)

(73) Assignee: BigObject Inc., Taipei (TW)

( * ) Notice: Subject to any disclaimer, the term of this patent is extended or adjusted under 35 U.S.C. 154(b) by 35 days.

(21) Appl. No.: 17/325,791

(22) Filed: May 20, 2021

(51) Int. Cl.
  *G06F 16/25* (2019.01)
  *G06F 16/2458* (2019.01)
  *G06F 16/242* (2019.01)
  *G06F 16/26* (2019.01)
  *H04L 67/00* (2022.01)

(52) U.S. Cl.
  CPC ........ *G06F 16/256* (2019.01); *G06F 16/2425* (2019.01); *G06F 16/2465* (2019.01); *G06F 16/258* (2019.01); *G06F 16/26* (2019.01); *H04L 67/34* (2013.01)

(58) Field of Classification Search
  CPC .............. G06F 16/256; G06F 16/2425; G06F 16/2465; G06F 16/258; G06F 16/26; H04L 67/34
  See application file for complete search history.

(56) References Cited

U.S. PATENT DOCUMENTS

| | | | |
|---|---|---|---|
| 2011/0179021 A1* | 7/2011 | Wen | G06F 16/58 707/723 |
| 2017/0193116 A1* | 7/2017 | Wong | G06F 16/2456 |
| 2019/0362003 A1* | 11/2019 | Zhang | G06F 16/24535 |

* cited by examiner

Primary Examiner — Cam Y T Truong
(74) Attorney, Agent, or Firm — Christensen, Fonder, Dardi & Herbert PLLC

(57) ABSTRACT

A federated data exploration system includes a first and a second interoperable data exploration apparatuses. The first interoperable data exploration apparatus executes a data process engine and has a first data object. The data process engine enables a display screen to display a visualization user interface, which includes a first and second display areas respectively for the first and second data object. The second data object belongs to the second interoperable data exploration apparatus. The data process engine explores the second data object by issuing a sequence of queries in response to a sequence of operations on the second display area to narrow down a target of interest. The data process engine receives a first set of identifiers corresponding to the target of interest from the second data object and produces a target dataset by querying the first data object according to the first set of identifiers.

12 Claims, 3 Drawing Sheets

US 11,494,398 B1

FEDERATED DATA EXPLORATION SYSTEMS AND INTEROPERABLE DATA EXPLORATION APPARATUSES

FIELD

The present invention relates to federated data exploration systems and interoperable data exploration apparatuses. More specifically, the present invention relates to federated data exploration systems and interoperable data exploration apparatuses with fine granularity of access control that separate data ownership from the use of data when sharing data among interoperable data exploration apparatuses.

BACKGROUND

With the advent of the big data era, more and more users (e.g., persons, enterprises, and organizations) collect various kinds of data for analysis and then make decisions based on analysis results. However, high-quality decisions are often made together with external data such as open data and third-party market data. As the scope of data owned by a user is quite limited, sharing data among users to make more accurate decisions is the trend.

Conventionally, sharing data among users is achieved by providing files to be downloaded or to be accessed via Application Programming Interfaces (APIs), which, however, have several drawbacks. First, data owners may lose their unique data ownership because the data sets will be possessed by other user(s) after sharing, who may further redistribute the data sets to others. Hence, most data owners are hesitant to share their data. Second, since data owners may lose their unique data ownerships after sharing data, they tend to provide data from their viewpoints rather than from users' viewpoints. As a consequence, a user that is looking for useful information may derive data that is not ready or not easy to use. Every user who accesses data is required to take time and data-processing skills to convert raw data to something ready. Third, it is difficult to a user to analyze across multiple datasets owned by different owners without putting together all datasets in one database and aligning the common attributes for cross referencing. It is again a very time-consuming and labor-intensive task to retrieve and prepare multiple datasets from different data sources. That is, cross analysis on multiple datasets belonging to different owners is difficult to be achieved with today's means of data sharing (i.e., file downloading and API). Forth, file-based data sharing imposes constraints on access control at file level for all users, who have no choice but download a file as a whole. Loading a large data file with a great number of dimensions (i.e., columns) is a time-consuming task and requires sufficient local storage to retain the downloaded file, even though the data users use only a very small portion of downloaded data in their applications.

Furthermore, fine granularity of data access (i.e., in any combination of dimensions and any value conditions such as state is 'NY') becomes critical in today's data applications, especially for streaming data analytics. It is desired that the granularity of data access can be requested by the users and granted by the data owners. With data exploration and fine granularity of data access control, the data owners may design a way to charge users by data usage.

Consequently, to facilitate the usage of data, an interoperable data exploration mechanism with fine granularity of access control that can separate data ownership from the use of data and have a user-friendly interface for finding out interested data at any level of data granularity quickly and easily is needed.

SUMMARY

Provided is an interoperable data exploration apparatus. The interoperable data exploration apparatus comprises a transceiving interface, a processor, and a storage device, wherein the processor is electrically connected to the transceiving interface and the storage device. The processor is configured to install a data object package including a data process engine, a database, and a visualization user interface and execute the data process engine, wherein the data process engine continuously inputs a stream of data into the database to derive a first data object. The storage device is configured to retain the first data object.

The data process engine enables a display screen to display the visualization user interface comprising a first display area for the first data object and a second display area for a second data object belonging to another interoperable data exploration apparatus by establishing a connection to the another interoperable data exploration apparatus via the transceiving interface. The another interoperable data exploration apparatus performs a first task of data exploration on the second data object by issuing a first sequence of queries in response to a first sequence of operations on the second display area to narrow down a target of interest, wherein each query is applied on a resulted dataset of the previous query, and the first query is applied on the second data object. The data process engine receives, via the connection, a first set of identifiers corresponding to the target of interest from the second data object and performs a second task of data exploration on the first data object by issuing a second sequence of queries in response to a second sequence of operations on the first display area according to the first set of identifiers to produce a target dataset.

Provided is an interoperable data exploration apparatus. The interoperable data exploration apparatus comprises a transceiving interface, a processor, and a storage device, wherein the processor is electrically connected to the transceiving interface and the storage device. The processor is configured to install a data object package including a data process engine, a database, and a visualization user interface and execute the data process engine, wherein the data process engine continuously inputs a stream of data into the database to derive a first data object. The storage device is configured to retain the first data object.

The data process engine enables a display screen to display the visualization user interface comprising a first display area for the first data object and a second display area for a second data object belonging to another interoperable data exploration apparatus by establishing a connection to the another interoperable data exploration apparatus via the transceiving interface. The data process engine performs a first task of data exploration on the first data object by issuing a first sequence of queries in response to a first sequence of operations on the first display area to narrow down a target of interest, wherein each query is applied on a resulted dataset of the previous query, and the first query is applied on the first data object. The data process engine receives a first set of identifiers corresponding to the target of interest from the first data object and transmits the first set of identifiers to the another interoperable data exploration apparatus via the connection. The another interoperable data exploration apparatus performs a second task of data exploration on the second data object by issuing a second sequence of queries in response to a second sequence of operations on the second display area according to the first set of identifiers to produce a target dataset.

Provided is a federated data exploration system. The federated data exploration system comprises a central management apparatus, a first interoperable data exploration apparatus, and a second interoperable data exploration apparatus. Each of the first and second interoperable data exploration apparatuses installs a data object package including a data process engine, a database, and a visualization user interface. The first interoperable data exploration continuously inputs a first stream of data into the corresponding database to derive a first data object by the corresponding data process engine, retains the first data object, and transmits a first piece of meta information to the central management apparatus to register the first data object. The first piece of meta information describes a plurality of first identifiers and a plurality of first attributes. The second interoperable data exploration continuously inputs a second stream of data into the corresponding database to derive a second data object, retains the second data object, and transmits a second piece of meta information to the central management apparatus to register the second data object. The second piece of meta information describes a plurality of second identifiers and a plurality of second attributes. The first interoperable data exploration apparatus transmits a message to the central management apparatus for subscribing the second data object of the second interoperable data exploration apparatus.

The first interoperable data exploration apparatus enables a display screen to display the corresponding visualization user interface comprising a first display area for the first data object and a second display area for the second data object by establishing a connection to the second interoperable data exploration apparatus. The second interoperable data exploration apparatus performs a first task of data exploration on the second data object by issuing a first sequence of queries in response to a first sequence of operations on the second display area to narrow down a target of interest, wherein each query is applied on a resulted dataset of the previous query, and the first query is applied on the second data object. The second interoperable data exploration apparatus transmits a first set of identifiers corresponding to the target of interest to the central management apparatus, the central management apparatus transmits a second set of identifiers corresponding to the first set of identifiers to the first interoperable data exploration apparatus, and the first interoperable data exploration apparatus performs a second task of data exploration on the first data object by issuing a second sequence of queries in response to a second sequence of operations on the first display area according to the second set of identifiers to produce a target dataset.

Provided is a federated data exploration system. The federated data exploration system comprises a central management apparatus, a first interoperable data exploration apparatus, and a second interoperable data exploration apparatus. Each of the first and second interoperable data exploration apparatuses installs a data object package including a data process engine, a database, and a visualization user interface. The first interoperable data exploration continuously inputs a first stream of data into the corresponding database to derive a first data object by the corresponding data process engine, retains the first data object, and transmits a first piece of meta information to the central management apparatus to register the first data object. The first piece of meta information describes a plurality of first identifiers and a plurality of first attributes. The second interoperable data exploration continuously inputs a second stream of data into the corresponding database to derive a second data object, retains the second data object, and transmits a second piece of meta information to the central management apparatus to register the second data object. The second piece of meta information describes a plurality of second identifiers and a plurality of second attributes. The first interoperable data exploration apparatus transmits a message to the central management apparatus for subscribing the second data object.

The first interoperable data exploration apparatus enables a display screen to display the corresponding visualization user interface comprising a first display area for the first data object and a second display area for the second data object by establishing a connection to the second interoperable data exploration apparatus. The first interoperable data exploration apparatus performs a first task of data exploration on the first data object by issuing a first sequence of queries in response to a first sequence of operations on the first display area to narrow down a target of interest, wherein each query is applied on a resulted dataset of the previous query, and the first query is applied on the first data object. The first interoperable data exploration apparatus transmits a first set of identifiers corresponding to the target of interest to the central management apparatus. The central management apparatus transmits a second set of identifiers corresponding to the first set of identifiers to the second interoperable data exploration apparatus. The second data exploration apparatus performs a second task of data exploration on the second data object by issuing a second sequence of queries in response to a second sequence of operations on the second display area according to the second set of identifiers to produce a target dataset.

According to the above descriptions, the provided data exploration mechanisms separate data ownership from the use of data and have a user-friendly visualization user interface for users to find out interested data (i.e., target of interest) quickly and easily. From the viewpoint of the data owner (e.g., the second interoperable data exploration apparatus), data ownership is kept because the data user (e.g., the first interoperable data exploration apparatus) can only derive a set of identifiers from the data owner or use a set of identifiers to explore the data object of the data owner. The data owner will feel protective because its data object will not be possessed by the data user. From the viewpoint of the data user, cross analysis among multiple datasets (i.e., data objects) can be achieved because the data user can use a set of identifiers derived from the data object of one interoperable data exploration apparatus to explore the data object of another interoperable data exploration apparatus. Exchanging a sect of identifiers instead of exchanging or sharing the entire datasets can be considered as an effective and efficient way of interoperating among multiple datasets (i.e., data objects).

The mechanism of interoperable data exploration apparatus may adopt an object-oriented approach, aimed to encapsulate data and code for the purpose of data sharing while protecting data ownerships. Another critical criterion for data sharing is the interoperability of the interoperable data exploration apparatuses, with which a business user or data analyst can visually explore and analyze across multiple data sets hosted in different data planets. As the data owners feel protective and beneficial from the data sharing, it is very promising that a data eco-system such as data market, supply chain collaboration platform, industry data platform is ready to launch. Therefore, usage of data between users can be facilitated.

The detailed technology and preferred embodiments implemented for the subject invention are described in the following paragraphs accompanying the appended drawings for a person having ordinary skill in the art to well appreciate the features of the claimed invention.

DETAILED DESCRIPTION

In the following descriptions, the federated data exploration systems and interoperable data exploration apparatuses will be explained with reference to certain embodiments thereof. However, these embodiments are not intended to limit the present invention to any specific environment, example, embodiment, applications, or implementations described in these embodiments. Therefore, descriptions of these embodiments are only for purpose of illustration rather than to limit the scope of the present invention. It should be appreciated that, in the following embodiments and the attached drawings, elements unrelated to the present invention are omitted from depiction. In addition, dimensions of and dimensional scales between individual elements in the attached drawings are provided only for ease of depiction and illustration but not to limit the scope of the present invention.

The key idea of the present invention is to provide mechanisms that a data owner can encapsulate and host a structure of data in an interoperable data exploration apparatus, while allowing data users (Information Technology (IT) users or non-IT users) to interactively explore data object to uncover initial patterns, characteristics, and points of interest in an unplanned, unstructured, but controllable way before downloading a subset of data for deep analysis. A federated data exploration system of the present invention further enables data users to visually explore and analyze across multiple data sets hosted in different interoperable data exploration apparatuses in order to track down a target of interest. Data owners protect their data from being possessed wholly by others by sharing only identifiers related to the resulted subsets of data derived from interoperable data exploration. The ownership of an interoperable data exploration apparatus can be further secured by non-fungible token (NFT) or other appropriate mechanisms. Therefore, the present invention can achieve the technical effect of providing interoperability or data exploration and cross analysis among datasets belonging to different data owners.

Figure 1A:
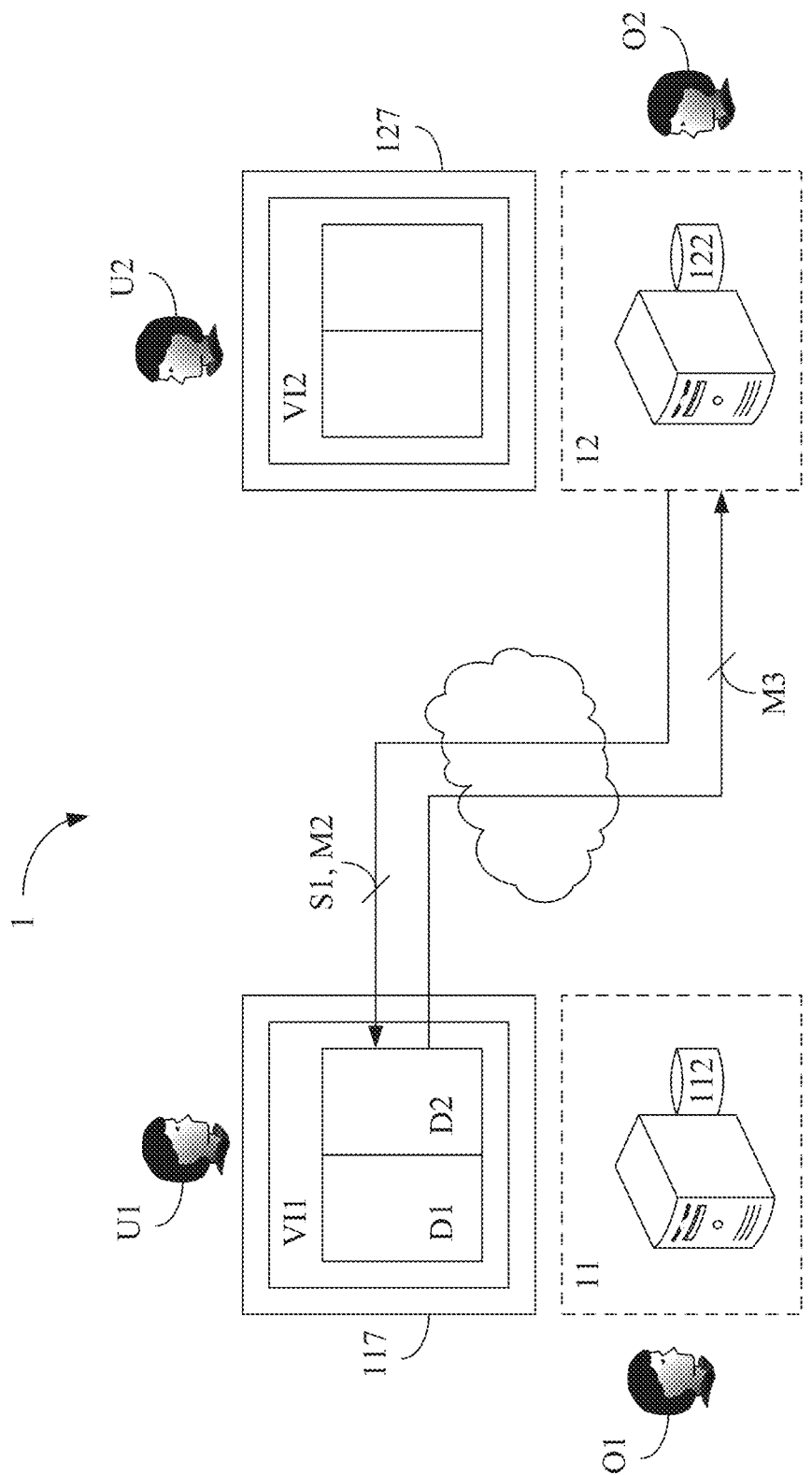
FIG. 1A illustrates a schematic view of the federated data exploration system 1 of the first embodiment of the present invention.

A first embodiment of the present invention is a federated data exploration system 1, and a schematic view of which is illustrated in FIG. 1A. The federated data exploration system 1 comprises two interoperable data exploration apparatuses 11, 12 respectively owned by the data owners O1, O2. The interoperable data exploration apparatuses 11, 12 may share data in response to sequences of operations performed by user. It is emphasized that data sharing between the interoperable data exploration apparatuses 11, 12 will be achieved in a way that separates data ownership from the use of data. In other words, the data object retained in the interoperable data exploration apparatus 11 (i.e., data owned by the data owner O1) can be explored by a user U2 of the interoperable data exploration apparatus 12 without sacrificing the data ownership of the data owner O1. Likewise, the data object retained in the interoperable data exploration apparatus 12 (i.e., data owned by the data owner O2) can be explored by a user U1 of the interoperable data exploration apparatus 11 without sacrificing the data ownership of the data owner O2. The details to achieve the separation of data ownership and the use of data will be described later.

Figure 1B:
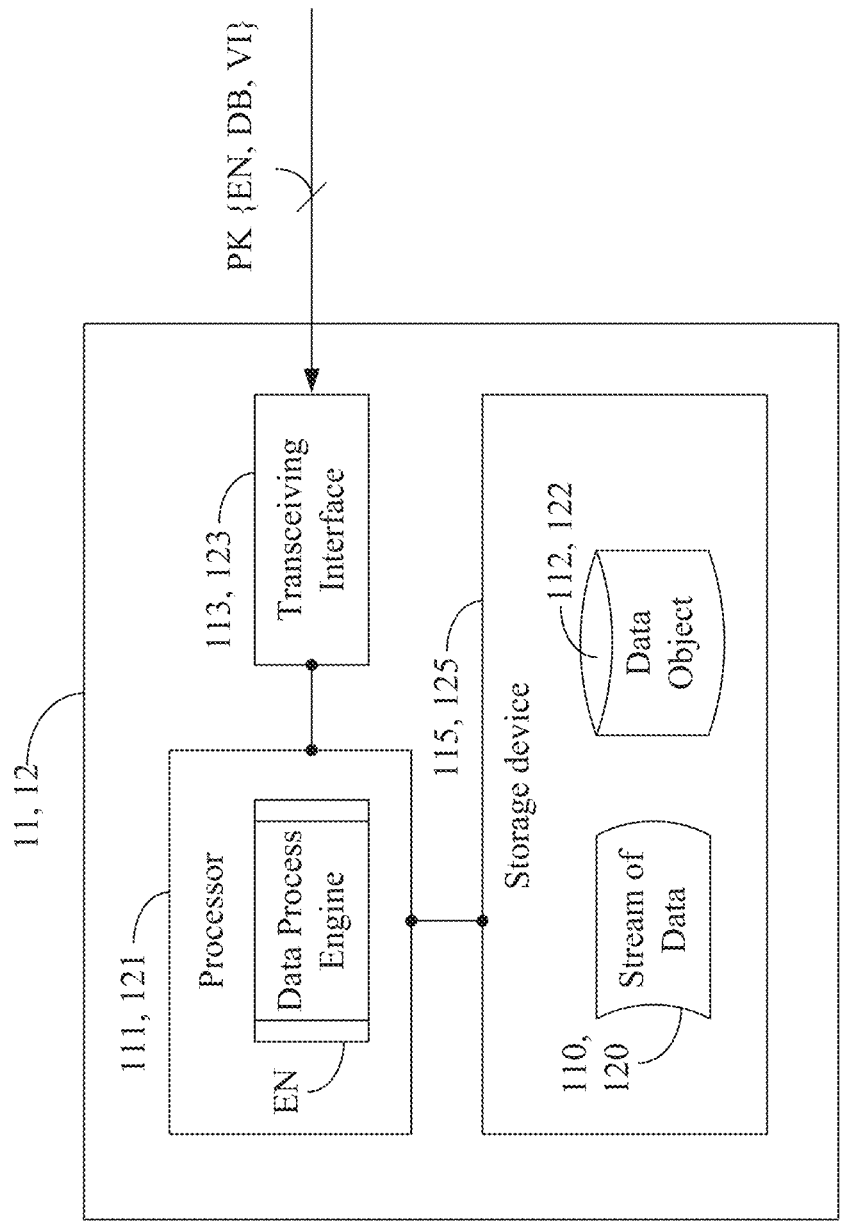
FIG. 1B illustrates a schematic view of an interoperable data exploration apparatus in a federated data exploration system.

Each of the interoperable data exploration apparatuses 11, 12 is an electronic computing apparatus such as a desktop computer, a notebook, and a tablet. FIG. 1B illustrates a schematic view of the interoperable data exploration apparatuses 11, 12. The interoperable data exploration apparatus 11 comprises a processor 111, a transceiving interface 113, and a storage device 115, wherein the processor 111 is electrically connected to the transceiving interface 113 and the storage device 115. Similarly, the interoperable data exploration apparatus 12 comprises a processor 121, a transceiving interface 123, and a storage device 125, wherein the processor 121 is electrically connected to the transceiving interface 123 and the storage device 125.

Each of the processors 111, 121 may be any kind of processing unit, central processing unit (CPU), microprocessor, digital signal processor (DSP), or any kind of computing device with similar functions and well-known to those skilled in the art. Each of the transceiving interface 113, 123 maybe a wired interface or a wireless interface, which is configured to connect to a network (e.g., an Internet, a local area network) for transceiving signals and receiving data via the network. Each of the storage device 115, 125 may be a hard disk (e.g., solid state disk) or other non-transitory computer readable storage medium/device that can store various kinds of digital data and well-known to those skilled in the art.

In this embodiment, the interoperable data exploration apparatuses 11, 12 may perform similar operations, have similar functions, and deliver similar technical effects, hence the following descriptions will focus on one interoperable data exploration apparatus, say, the interoperable data exploration apparatuses 11.

Before sharing data with other interoperable data exploration apparatus and/or exploring data of other interoperable data exploration apparatus, the interoperable data exploration apparatuses 11 receives, via the transceiving interface 113, a data object package PK from another apparatus (e.g., downloads from a server). The data object package PK comprises a data process engine EN, a database DB, and a visualization user interface VI. The database DB provided in the data object package PK may be any kind of database that can let a data owner organize data in a structured way, such as a relation database, a graph database, and a NoSQL database. In some embodiments, the storage device 115 of the interoperable data exploration apparatus 11 may already store the data object package PK, hence it is not required to receive the data object package PK from other apparatus.

The processor 111 installs the data object package PK and executes the data process engine EN so that the data process engine EN continuously inputs a stream of data 110 into the database DB to derive a data object 112. Please note that, in some embodiments, the data owner O1 may operate on the visualization user interface VI1 displayed on the display screen 117 to determine how to input the stream of data 110 into the database DB (e.g., which attribute of the stream of data 110 corresponds to which dimension in the database DB) so that the data process engine EN can act accordingly. The storage device 115 will retain the data object 112. The interoperable data exploration apparatuses 12 will perform similar operations to derive a data object 122 from the stream of data 120. Similarly, the data owner O2 may operate on the visualization user interface VI2 displayed on the display screen 127 to determine how to input the stream of data 120 into the database DB. With the data process engine, the visualization user interface, and the data object, each of the interoperable data exploration apparatuses 11, 12 alone is a self-sufficient data platform to offer IT users and/or non-IT users to visually explore, analyze, and cross-analyze multiple interoperable data exploration apparatuses, and provides IT or programmers to access data via APIs. The details are given below.

The data process engine EN executed by the interoperable data exploration apparatus 11 enables a display screen 117 to display the visualization user interface VI1. The visualization user interface VI1 comprises a display area D1 for the data object owned by the interoperable data exploration apparatuses 11 itself and a display area D2 for the data object owned by others (i.e., the data object that the interoperable data exploration apparatus 11 is going to explore). In order to enable the display area D2 to display data object owned by another interoperable data exploration apparatus, the data process engine EN executed by the interoperable data exploration apparatus 11 establishes, via the transceiving interface 113, a connection between the interoperable data exploration apparatus 11 and the another interoperable data exploration apparatus. The aforesaid connection is a connection over network. In this embodiment, the display area D1 is for the data object 112 while the display area D2 is for the data object 122 belonging to the interoperable data exploration apparatus 12. In order to enable the display area D2 to display data object 112, the data process engine EN executed by the interoperable data exploration apparatus 11 establishes a connection between the interoperable data exploration apparatus 11 and the interoperable data exploration apparatus 12.

The user U1 may perform a first sequence of operations (not shown) on the display area D2 to dig into the data object 122 for useful information. In some embodiments, if the data object 122 is a dataset (not shown) having a plurality of dimensions (not shown), the first sequence of operations that the user U1 performed on the display area D2 is related to a subset of key dimensions. The first sequence of operations on the display area D2 is related to selecting an ordered combination of the dimensions with values, and each operation is based on the selected dimensions of the previous operation followed by an arbitrary dimension among the dimensions, and each query generates a temporary set of identifiers for every key dimension. In response to the first sequence of operations that the user U1 performed on the display area D2, the data process engine EN executed on the interoperable data exploration apparatus 12 performs a first task of data exploration on the data object 122 by issuing a first sequence of queries (not shown) to narrow down a target of interest (not shown), such as users who had bought a specific product in a certain city, cars having a driving speed in the range of 60 to 80 Km/h in Taipei City last month. Please note that each query is applied on a resulted dataset (not shown) of the previous query, and the first query is applied on the data object 122. Afterwards, the data process engine EN executed on the interoperable data exploration apparatus 11 receives, via the connection between the interoperable data exploration apparatuses 11, 12, a first set S1 of identifiers corresponding to the target of interest from the data object 122 so that the data process engine EN executed on the interoperable data exploration apparatus 11 can utilize it for further analysis.

In some embodiments, when narrowing down to the target of interest, the user U1 may determine whether the current resulted dataset shown on the display area D2 is the target of interest. If affirmative, the user U1 may perform a confirmation operation on the display area D2 (e.g., click a confirmation button on the display area D2) so that the interoperable data exploration apparatus 12 creates an identifiable label (not shown) corresponding to the target of interest, wherein the identifiable label corresponds to the first set S1 of identifiers. Then, the data process engine EN executed by the interoperable data exploration apparatus 11 receives, via the connection between the interoperable data exploration apparatuses 11, 12, a notification message M2 regarding the creation of the identifiable label. The data process engine EN executed by the interoperable data exploration apparatus 11 transmits, via the connection between the interoperable data exploration apparatuses 11, 12, a request M3 for the first set S1 of identifiers corresponding to the target of interest to the interoperable data exploration apparatus 12. Then, the data process engine EN executed by the interoperable data exploration apparatus 11 receives, via the connection between the interoperable data exploration apparatuses 11, 12, the first set S1 of identifiers.

In some embodiments, the data process engine EN executed by the interoperable data exploration apparatus 11 further receives, via the connection between the interoperable data exploration apparatuses 11, 12, at least one attribute of each identifier in the first set S1 of identifiers from the data object 122.

Then, the user U1 may dig into the data object 112 for useful information according to the first set S1 of identifiers. To be more specific, the user U1 may perform a second sequence of operations (not shown) on the display area D1 to dig into the data object 112 for useful information according to the first set S1 of identifiers. In some embodiments, if the data object 112 is a dataset (not shown) having a plurality of dimensions (not shown), the second sequence of operations that the user U1 performed on the display area D1 is related to a subset of the dimensions, and each operation is based on a selected dimension combination of the previous operation followed by an arbitrary dimension of the dimensions. In response to the second sequence of operations that the user U1 performed on the display area D1, the data process engine EN executed by the interoperable data exploration apparatus 11 performs a second task of data exploration on the data object 112 by issuing a second sequence of queries according to the first set S1 of identifiers to produce a target dataset (not shown).

In some embodiments, if the data process engine EN executed by the interoperable data exploration apparatus 11 also receives at least one attribute of each identifier in the first set S1 of identifiers from the data object 122, the data process engine EN executed by the interoperable data exploration apparatus 11 performs data exploration on the data object 112 by issuing the second sequence of queries according to the first set S1 of identifiers and the attributes to produce a target dataset.

In some embodiments, the data object 112 and the data object 122 may adopt different coding schemes regarding the same item (e.g., attribute, dimension). For those embodiments, after receiving the first set S1 of identifiers, the data process engine EN executed by the interoperable data exploration apparatus 11 transforms the first set S1 of identifiers into a second set of identifiers one-to-one. Then, the data process engine EN executed by the interoperable data exploration apparatus 11 performs data exploration on the data object 112 by issuing the second sequence of queries in response to the second sequence of operations on the display area D1 according to the second set of identifiers.

In some embodiments, the aforementioned data exploration can be performed in an opposite way. The user U1 may perform a first sequence of operations (not shown) on the display area D1 to dig into the data object 112 for useful information. In response to the first sequence of operations that the user U1 performed on the display area D1, the data process engine EN executed by the interoperable data exploration apparatus 11 performs a first task of data exploration on the data object 112 by issuing a first sequence of queries (not shown) to narrow down a target of interest (not shown). Then, the data process engine EN executed by the interoperable data exploration apparatus 11 receives the set S1 of identifiers corresponding to the target of interest from the data object 112. Then, the data process engine EN executed by the interoperable data exploration apparatus 11 transmits the first set of identifiers to the interoperable data exploration apparatus 12 via the connection. The data process engine EN executed by the interoperable data exploration apparatus 12 performs a second task of data exploration on the data object 122 by issuing a second sequence of queries in response to a second sequence of operations on the display area D2 according to the set S1 of identifiers.

In some embodiments, when narrowing down to the target of interest, the user U1 may determine whether the current resulted dataset shown on the display area D1 is the target of interest. If affirmative, the user U1 may perform a confirmation operation on the display area D1 (e.g., click a button on the display area D1) so that the data process engine EN executed by the interoperable data exploration apparatus 11 generates an identifiable label corresponding to the target of interest in response to the confirmation operation on the display area D1, wherein the identifiable label corresponds to the first set S1 of identifiers. Then, the data process engine EN executed by the interoperable data exploration apparatus 11 transmits, via the connection, a notification message regarding the creation of the identifiable label to the interoperable data exploration apparatus 12. Then, the data process engine EN executed by the interoperable data exploration apparatus 11 receives, via the connection, a request for the first set of identifiers from the interoperable data exploration apparatus 12. Then, the data process engine EN transmits, via the connection, the first set of identifiers to the interoperable data exploration apparatus 12 for digging into the data object 122 for useful information. A person having ordinary skill in the art will understand the details regarding this scenario based on the above descriptions. Thus, the details will not be repeated.

According to the above descriptions, a user using the interoperable data exploration apparatus 11 may explore the data object 122 stored in the interoperable data exploration apparatus 12 via the visualization user interface VI, which is quick and easy. After finding out the target of interest from the data object 122, the interoperable data exploration apparatus 11 only derives the set S1 of identifiers corresponding to the target of interest instead of the data corresponding to the target of interest. From the viewpoint of the data owner (i.e., the interoperable data exploration apparatus 12), data ownership is kept because the data requester (i.e., the interoperable data exploration apparatus 11) only derives the set S1 of identifiers. From the viewpoint of the data requester, the set S1 of identifiers is valuable because it is related to the data object 122 of other interoperable data exploration apparatus and carries information that the data requester does not have. Hence, the data requester may query its own data object according to the set of identifiers to produce a target dataset.

According to the above descriptions, the federated data exploration system 1 separate data ownership from the use of data and have a user-friendly visualization user interface for users to find out interested data quickly and easily. By providing the visualization user interface, IT or non-IT users can interactively explore data object to uncover target of interest by performing a sequence of operations on a display area. From the viewpoint of the data owner (e.g., the second interoperable data exploration apparatus), data ownership is kept because the data user (e.g., the first interoperable data exploration apparatus) can only derive a set of identifiers from the data owner or use a set of identifiers to explore the data object of the data owner. The data owner will feel protective because its data object will not be possessed by the data user. From the viewpoint of the data user, cross analysis among multiple datasets (i.e., data objects) can be achieved because the data user can use a set of identifiers derived from the data object of one interoperable data exploration apparatus to explore the data object of another interoperable data exploration apparatus. Exchanging a sect of identifiers instead of exchanging or sharing the entire datasets can be considered as an effective and efficient way of interoperating among multiple datasets (i.e., data objects). The federated data exploration system 1 achieves cross analysis on multiple interoperable data exploration apparatuses by exchanging a sect of identifiers, which may generate more synergetic results and reveal unexpected insights and/or facts. Therefore, usage of data between parties can be facilitated.

Figure 2:
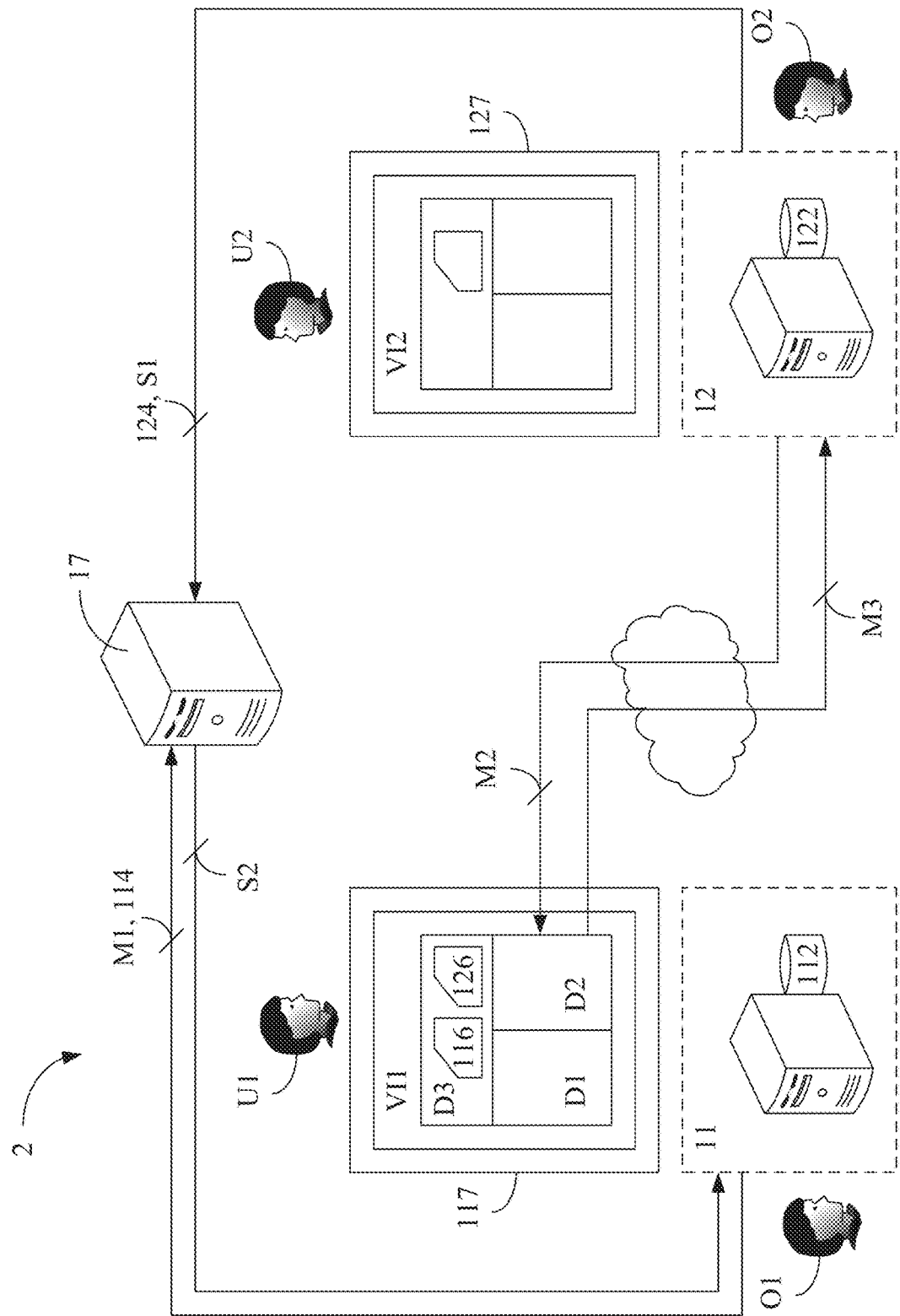
FIG. 2 illustrates a schematic view of the federated data exploration system 2 of the second embodiment of the present invention.

A second embodiment of the present invention is a federated data exploration system 2, and a schematic view of which is illustrated in FIG. 2. The federated data exploration system 2 comprises two interoperable data exploration apparatuses 11, 12 and a central management apparatus 15. The central management apparatus 15 may be any kind of electronic computing apparatus that can communicate with other electronic computing apparatus, such as a cloud server. Please note that, in other embodiments, the federated data exploration system 2 may comprise more than two interoperable data exploration apparatuses.

Comparing to the federated data exploration system 1, the federated data exploration system 2 can execute the same operations, has the same functions, and achieves the same technical effect. Therefore, in the following descriptions, only the differences between the federated data exploration system 2 and the federated data exploration system 1 will be described in details.

In this embodiment, the central management apparatus 15 is a hub (an exchange) that allows registration and subscription for the interoperable data exploration apparatuses 11, 12, maintains meta information for the interoperable data exploration apparatuses 11, 12 for search purpose, and provides a way to exchange sets of identifiers from the targets of interests. For example, meta information of an interoperable data exploration apparatus may comprise name, URL, and sharing and access control policy.

Specifically, an interoperable data exploration apparatus that is going to join the federated data exploration system 2 for sharing data with other interoperable data exploration apparatus and/or exploring data of other interoperable data exploration apparatus has to register at the central management apparatus 15. Specifically, the interoperable data exploration apparatus 11 transmits, via the transceiving interface 113, a piece of meta information 114 of the data object 112 to the central management apparatus 15 to register the data object 112. The first piece of meta information 114 describes a plurality of first identifiers and a plurality of first attributes. Similarly, the interoperable data exploration apparatuses 12 transmits, via the transceiving interface 123, a piece of meta information 124 of the data objects 122 to the central management apparatus 15 to register the data object 122. The second piece of meta information describes a plurality of second identifiers and a plurality of second attributes.

In this embodiment, if the user of an interoperable data exploration apparatus is interested in the data object in another interoperable data exploration apparatus, the interoperable data exploration apparatus has to transmit a message to the central management apparatus 15 for subscribing the data object in that interoperable data exploration apparatus. In some embodiments, the message for subscribing a data object may comprise an access control for controlling an accessibility of a subset of the data object. For example, the user of the interoperable data exploration apparatus 11 is interested in the data object 122 in the interoperable data exploration apparatus 12. The interoperable data exploration apparatus 11 has to transmit, via the transceiving interface 113, a message M1 to the central management apparatus 15 for subscribing the data object 122. After the subscription, the interoperable data exploration apparatus 11 has the right to explore the data object 122. In some embodiments, the message M1 for subscribing the data object 122 comprises the access control for controlling the accessibility of a subset of the data object 122. If the data object 122 is a dataset having a plurality of dimensions, the access control controls which dimensions can be accessed by the interoperable data exploration apparatus 11.

In some embodiments, the visualization user interface VI displayed on the display screen comprises a display area D3 in addition to the display areas D1 and D2 as shown in FIG. 2. Specifically, the display area D3 is configured to display a plurality registered data objects 116, 126 of the central management apparatus 15. Each of the registered data objects 116, 126 has a registered piece of meta information in the central management apparatus 15, wherein the registered pieces of meta information and the first piece of meta information 114 has at least one common identifier description. In this way, a user of the interoperable data exploration apparatuses 11 may browse the registered data objects 116, 126 and find out the data object that he or she is interested in.

In this embodiment, after the data process engine EN of the interoperable data exploration apparatus 11 narrows down a target of interest from the data object 122, the central management apparatus 15 will handle the exchange of the identifiers corresponding to the target of interest. Specifically, the interoperable data exploration apparatus 12 transmits the set S1 of identifiers corresponding to the target of interest to the central management apparatus 15. The central management apparatus 15 transforms the set S1 of identifiers into the set S2 of identifiers one-to-one and then transmits the set S2 of identifiers to the interoperable data exploration apparatus 11.

In some embodiments, when narrowing down to the target of interest, the user U1 may determine whether the current resulted dataset shown on the display area D2 is the target of interest. If affirmative, the user U1 may perform a confirmation operation on the display area D2 so that the interoperable data exploration apparatus 12 creates an identifiable label corresponding to the target of interest accordingly. The identifiable label corresponds to the first set of identifiers. Then, the data process engine EN of the interoperable data exploration apparatus 11 receives, via the connection between the interoperable data exploration apparatuses 11, 12, a notification message M2 regarding the creation of the identifiable label.

Then, the data process engine EN of the interoperable data exploration apparatus 11 transmits, via the connection between the interoperable data exploration apparatuses 11, 12, a request M3 for the set S1 of identifiers to the interoperable data exploration apparatus 12. In these embodiments, the central management apparatus 15 will handle the exchange of the identifiers corresponding to the target of interest. Hence, the interoperable data exploration apparatus 12 transmits the set S1 of identifiers corresponding to the identifiable label to the central management apparatus 15. The central management apparatus 15 transforms the set S1 of identifiers into the set S2 of identifiers one-to-one and then transmits the set S2 of identifiers to the interoperable data exploration apparatus 11. Thereafter, the data process engine EN of the interoperable data exploration apparatus 11 can produce a target dataset by performing data exploration on the data object 112 by issuing a second sequence of queries in response to a second sequence of operations on the display area D1 according to the second set S2 of identifiers.

In some embodiments, the federated data exploration system 2 can achieve the aforementioned data exploration in an opposite way. A person having ordinary skill in the art will understand the details regarding this scenario based on the above descriptions. Thus, the details will not be repeated.

It shall be noted that, in the specification and the claims of the present invention, some words (including interoperable data exploration apparatus, data object, display area, sequence of queries, sequence of operations, set of identifiers) are preceded by terms such as "first," "second," or "third," and the usages of "first," "second," and "third" are only used to distinguish one term from the other.

According to the above descriptions, more advantages can be achieved by deploying the central management apparatus 15 in the federated data exploration system 2. An interoperable data exploration apparatus that is going to join the federated data exploration system 2 for sharing data with other interoperable data exploration apparatus and/or exploring data of other interoperable data exploration apparatus has to register at the central management apparatus 15. As the central management apparatus 15 maintains meta information of all interoperable data exploration apparatuses, a user of a registered interoperable data exploration apparatus can browse, via the visualization user interface VI, these meta information to search for the interoperable data exploration apparatus that he or she is interested in and then subscribe data object of that interoperable data exploration apparatus. Furthermore, since an interoperable data exploration apparatus has to subscribe the data object retained in other interoperable data exploration apparatus before exploring it, various degrees of access control can be made. Therefore, the federated data exploration system 2 achieves cross analysis on multiple interoperable data exploration apparatuses in a more friendly and a more secure way. Therefore, usage of data between parties can be facilitated.

The above disclosure is related to the detailed technical contents and inventive features thereof. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An interoperable data exploration apparatus, comprising:
a storage device;
a transceiving interface; and
a processor, being electrically connected to the storage device and the transceiving interface and configured to install a data object package including a data process engine, a database and a visualization user interface, and execute the data process engine,
wherein the data process engine continuously inputs a stream of data into the database to derive a first data object, and the storage device retains the first data object,
wherein the data process engine enables a display screen to display the visualization user interface comprising a first display area for the first data object and a second display area for a second data object belonging to another interoperable data exploration apparatus by establishing a connection to the another interoperable data exploration apparatus via the transceiving interface,
wherein the another interoperable data exploration apparatus performs a first task of data exploration on the second data object by issuing a first sequence of queries in response to a first sequence of operations on the second display area to narrow down a target of interest,
wherein each query of the first sequence of queries is applied on a resulted dataset of a previous query of the first sequence of queries, and a first query of the first sequence of queries is applied on the second data object, wherein the data process engine receives, via the connection, a first set of identifiers corresponding to the target of interest from the second data object and performs a second task of data exploration on the first data object by issuing a second sequence of queries in response to a second sequence of operations on the first display area according to the first set of identifiers to produce a target dataset, and
wherein the data process engine further transforms the first set of identifiers into a second set of identifiers one-to-one, wherein the target dataset is produced according to the second set of identifiers.

2. The interoperable data exploration apparatus of claim 1, wherein the second data object is a dataset of a plurality of dimensions including a subset of key dimensions, the first sequence of operations on the second display area is related to selecting an ordered subset of the dimensions with a plurality of values, and each operation of the first sequence of operations is based on the ordered subset of the dimensions of a previous operation followed by an arbitrary dimension among the dimensions, and each query of the first sequence of queries generates a temporary set of identifiers for every key dimension.

3. The interoperable data exploration apparatus of claim 1, wherein when narrowing down to the target of interest, the another interoperable data exploration apparatus creates an identifiable label corresponding to the target of interest on the second data object in response to a confirmation operation on the second display area, the identifiable label corresponds to the first set of identifiers, and the data process engine further performs following operations: receiving, via the connection, a notification message regarding the creation of the identifiable label, transmitting, via the connection, a request for the first set of identifiers to the another interoperable data exploration apparatus, and receiving, via the connection, the first set of identifiers from the another interoperable data exploration apparatus.

4. The interoperable data exploration apparatus of claim 1, wherein the data process engine further receives, via the connection, at least one attribute of each identifier in the first set of identifiers from the second data object and the data process engine performs the second task of data exploration on the first data object by issuing the second sequence of queries in response to the second sequence of operations on the first display area according to the first set of identifiers and the at least one attribute of each identifier in the first set of identifiers to produce the target dataset.

5. An interoperable data exploration apparatus, comprising:
a storage device;
a transceiving interface; and
a processor, being electrically connected to the storage device and the transceiving interface and configured to install a data object package including a data process engine, a database and a visualization user interface, and execute the data process engine,
wherein the data process engine continuously inputs a stream of data into the database to derive a first data object, and the storage device retains the first data object,
wherein the data process engine enables a display screen to display the visualization user interface comprising a first display area for the first data object and a second display area for a second data object belonging to another interoperable data exploration apparatus by establishing a connection to the another interoperable data exploration apparatus via the transceiving interface,
wherein the data process engine performs a first task of data exploration on the first data object by issuing a first sequence of queries in response to a first sequence of operations on the first display area to narrow down a target of interest, wherein each query of the first sequence of queries is applied on a resulted dataset of a previous query of the first sequence of queries, and a first query of the first sequence of queries is applied on the first data object,
wherein the data process engine receives a first set of identifiers corresponding to the target of interest from the first data object, transmits the first set of identifiers to the another interoperable data exploration apparatus via the connection, and the another interoperable data exploration apparatus performs a second task of data exploration on the second data object by issuing a second sequence of queries in response to a second sequence of operations on the second display area according to the first set of identifiers to produce a target dataset, and
wherein the data process engine further transforms the first set of identifiers into a second set of identifiers one-to-one, wherein the target dataset is produced according to the second set of identifiers.

6. The interoperable data exploration apparatus of claim 5, wherein the first data object is a dataset of a plurality of dimensions including a subset of key dimensions, the first sequence of operations on the first display area is related to selecting an ordered subset of dimensions with a plurality of values, each operation of the first sequence of operations is based on the ordered subset of dimensions of a previous operation of the first sequence of operations followed by an arbitrary dimension among the dimensions, and each query of the first sequence of queries generates a temporary set of identifiers for every key dimension of the subset of key dimensions.

7. The interoperable data exploration apparatus of claim 5, wherein when narrowing down to the target of interest, the data process engine further creates an identifiable label corresponding to the target of interest on the first data object in response to a confirmation operation on the first display area, the identifiable label corresponds to the first set of identifiers, and the data process engine further performs the following operations: transmitting, via the connection, a notification message regarding the creation of the identifiable label to the another interoperable data exploration apparatus, receiving, via the connection, a request for the first set of identifiers from the another interoperable data exploration apparatus, and transmitting, via the connection, the first set of identifiers to the another interoperable data exploration apparatus.

8. The interoperable data exploration apparatus of claim 5, wherein the data process engine further transmits, via the connection, at least one attribute of each identifier in the first set of identifiers from the first data object to the another interoperable data exploration apparatus, and the another interoperable data exploration apparatus performs the second task of data exploration on the second data object by issuing the second sequence of queries in response to the second sequence of operations on the second display area according to the first set of identifiers and the at least one attribute of each identifier in the first set of identifiers to produce the target dataset.

9. A federated data exploration system, comprising:
a central management apparatus that includes a processor; and
a first interoperable data exploration apparatus and a second interoperable data exploration apparatus,
wherein the first interoperable data exploration apparatus and the second interoperable data exploration apparatus installs a data object package including a data process engine, a database, and a visualization user interface,
wherein the first interoperable data exploration apparatus continuously inputs a first stream of data into a corresponding database to derive a first data object, retains the first data object, and transmits a first piece of meta information to the central management apparatus to register the first data object, and the first piece of meta information describes a plurality of first identifiers and a plurality of first attributes,
wherein the second interoperable data exploration apparatus continuously inputs a second stream of data into the corresponding database to derive a second data object, retains the second data object, and transmits a second piece of meta information to the central management apparatus to register the second data object, and the second piece of meta information describes a plurality of second identifiers and a plurality of second attributes,
wherein the first interoperable data exploration apparatus transmits a message to the central management apparatus for subscribing the second data object,
wherein the first interoperable data exploration apparatus enables a display screen to display a corresponding visualization user interface comprising a first display area for the first data object and a second display area for the second data object by establishing a connection to the second interoperable data exploration apparatus,
wherein the second interoperable data exploration apparatus performs a first task of data exploration on the second data object by issuing a first sequence of queries in response to a first sequence of operations on the second display area to narrow down a target of interest, each query of the first sequence of queries is applied on a resulted dataset of a previous query of the first sequence of queries, and a first query of the first sequence of queries is applied on the second data object,
wherein the second interoperable data exploration apparatus transmits a first set of identifiers corresponding to the target of interest to the central management apparatus,
wherein the central management apparatus transforms the first set of identifiers into the second set of identifiers one-to-one, the central management apparatus transmits the second set of identifiers corresponding to the first set of identifiers to the first interoperable data exploration apparatus, and the first interoperable data exploration apparatus performs a second task of data exploration on the first data object by issuing a second sequence of queries in response to a second sequence of operations on the first display area according to the second set of identifiers to produce a target dataset.

10. The federated data exploration system of claim 9, wherein the corresponding visualization user interface displayed on the display screen further comprises a third display area, the third display area is configured to display a plurality of registered data objects, each registered data object of the registered data objects has a registered piece of meta information in the central management apparatus, the registered pieces of meta information and the first piece of meta information have at least one common identifier description.

11. A federated data exploration system, comprising:
a central management apparatus that includes a processor; and
a first interoperable data exploration apparatus and a second interoperable data exploration apparatus,
wherein the first interoperable data exploration apparatus and the second interoperable data exploration apparatus installs a data object package including a data process engine, a database, and a visualization user interface,
wherein the first interoperable data exploration apparatus continuously inputs a first stream of data into a corresponding database to derive a first data object, retains the first data object, and transmits a first piece of meta information to the central management apparatus to register the first data object, and the first piece of meta information describes a plurality of first identifiers and a plurality of first attributes,
wherein the second interoperable data exploration apparatus continuously inputs a second stream of data into the corresponding database to derive a second data object, retains the second data object, and transmits a second piece of meta information to the central management apparatus to register the second data object, and the second piece of meta information describes a plurality of second identifiers and a plurality of second attributes,
wherein the first interoperable data exploration apparatus transmits a message to the central management apparatus for subscribing the second data object,
wherein the first interoperable data exploration apparatus enables a display screen to display a corresponding visualization user interface comprising a first display area for the first data object and a second display area for the second data object by establishing a connection to the second interoperable data exploration apparatus, wherein the first interoperable data exploration apparatus performs a first task of data exploration on the first data object by issuing a first sequence of queries in response to a first sequence of operations on the first display area to narrow down a target of interest, each query of the first sequence of queries is applied on a resulted dataset of a previous query of the first sequence of queries, and a first query of the first sequence of queries is applied on the first data object, wherein the first interoperable data exploration apparatus transmits a first set of identifiers corresponding to the target of interest to the central management apparatus, wherein the central management apparatus transforms the first set of identifiers into a second set of identifiers one-to-one, the central management apparatus transmits the second set of identifiers corresponding to the first set of identifiers to the second interoperable data exploration apparatus, and the second interoperable data exploration apparatus performs a second task of data exploration on the second data object by issuing a second sequence of queries in response to a second sequence of operations on the second display area according to the second set of identifiers to produce a target dataset.

12. The federated data exploration system of claim 11, wherein the corresponding visualization user interface displayed on the display screen further comprises a third display area, the third display area is configured to display a plurality of registered data objects, each registered data object of the registered data objects has a registered piece of meta information in the central management apparatus, the registered pieces of meta information and the first piece of meta information have at least one common identifier description.

* * * * *